(12) United States Patent
Chida

(10) Patent No.: US 8,422,503 B2
(45) Date of Patent: Apr. 16, 2013

(54) ADDRESS TRANSLATOR USING ADDRESS TRANSLATION INFORMATION IN HEADER AREA ON NETWORK LAYER LEVEL AND A METHOD THEREFOR

(75) Inventor: Koichi Chida, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 156 days.

(21) Appl. No.: 12/458,688

(22) Filed: Jul. 20, 2009

(65) Prior Publication Data
US 2010/0046517 A1    Feb. 25, 2010

(30) Foreign Application Priority Data
Aug. 19, 2008    (JP) .................................. 2008-210846

(51) Int. Cl.
*H04L 12/28* (2006.01)
*G06F 15/16* (2006.01)

(52) U.S. Cl.
USPC ........... 370/392; 370/352; 370/389; 370/401; 709/217; 709/227

(58) Field of Classification Search ................. 370/389, 370/392, 401; 709/217, 227
See application file for complete search history.

(56) References Cited

U.S. PATENT DOCUMENTS

| | | | | |
|---|---|---|---|---|
| 6,055,236 | A * | 4/2000 | Nessett et al. | 370/389 |
| 6,119,171 | A * | 9/2000 | Alkhatib | 709/245 |
| 6,430,623 | B1 * | 8/2002 | Alkhatib | 709/245 |
| 6,772,227 | B2 * | 8/2004 | Alkhatib | 709/245 |
| 6,839,338 | B1 * | 1/2005 | Amara et al. | 370/338 |
| 6,865,184 | B2 * | 3/2005 | Thubert et al. | 370/401 |
| 7,028,335 | B1 * | 4/2006 | Borella et al. | 726/11 |
| 7,031,328 | B2 * | 4/2006 | Thubert et al. | 370/401 |
| 7,032,242 | B1 * | 4/2006 | Grabelsky et al. | 726/11 |
| 7,133,404 | B1 * | 11/2006 | Alkhatib et al. | 370/392 |
| 7,149,225 | B2 * | 12/2006 | Thubert et al. | 370/401 |
| 7,327,683 | B2 * | 2/2008 | Ogier et al. | 370/236 |
| 7,328,281 | B2 * | 2/2008 | Takeda et al. | 709/246 |
| 7,443,849 | B2 * | 10/2008 | Biswas et al. | 370/389 |

(Continued)

FOREIGN PATENT DOCUMENTS

| | | |
|---|---|---|
| JP | 7-030544 A | 1/1995 |
| JP | 2000-270004 A | 9/2000 |
| JP | 2006-005754 A | 1/2006 |

OTHER PUBLICATIONS

P. Srisuresh et al., Traditional IP Network Address Translator (Traditional NAT), Network Working Group, Request for Comments: 3022, The Internet Engineering Task Force, Jan. 2001.

(Continued)

*Primary Examiner* — Phirin Sam
*Assistant Examiner* — Venkatesh Haliyur
(74) *Attorney, Agent, or Firm* — Rabin & Berdo, P.C.

(57) ABSTRACT

An address translator carries out address translation between a private address and a global address on a source address or a destination address included in the header of a received packet. The translator includes an address translation processor for applying address translation information to the header area of the received packet on a network layer level and carrying out address translation on the network layer level by means of the address translation information. Thus, the translator can establish high transparency, high possibility to establish interconnection, impartial assurance for users, high throughput and high availability, and thus provide open measures minimizing interrupt actions of any communication as well as possible.

12 Claims, 5 Drawing Sheets

U.S. PATENT DOCUMENTS

| | | | |
|---|---|---|---|
| 7,453,887 B2 * | 11/2008 | Thubert et al. | 370/395.52 |
| 7,551,632 B2 * | 6/2009 | Thubert et al. | 370/401 |
| 7,680,104 B2 * | 3/2010 | Shore | 370/389 |
| 7,861,080 B2 * | 12/2010 | Wakameda | 713/160 |
| 7,941,563 B2 * | 5/2011 | Takeda et al. | 709/246 |
| 8,015,402 B2 * | 9/2011 | Ogura et al. | 713/161 |
| 2002/0184390 A1 * | 12/2002 | Alkhatib | 709/245 |
| 2003/0179742 A1 * | 9/2003 | Ogier et al. | 370/351 |
| 2003/0225912 A1 * | 12/2003 | Takeda et al. | 709/246 |
| 2004/0179508 A1 * | 9/2004 | Thubert et al. | 370/349 |
| 2004/0179532 A1 * | 9/2004 | Thubert et al. | 370/395.5 |
| 2004/0179536 A1 * | 9/2004 | Thubert et al. | 370/395.52 |
| 2004/0255166 A1 * | 12/2004 | Shimizu | 713/201 |
| 2005/0010668 A1 * | 1/2005 | Chen | 709/227 |
| 2005/0063352 A1 * | 3/2005 | Amara et al. | 370/338 |
| 2005/0152298 A1 * | 7/2005 | Thubert et al. | 370/312 |
| 2006/0120382 A1 * | 6/2006 | Thubert et al. | 370/395.52 |
| 2006/0146813 A1 * | 7/2006 | Biswas et al. | 370/389 |
| 2006/0182118 A1 * | 8/2006 | Lam et al. | 370/395.42 |
| 2006/0215657 A1 * | 9/2006 | Lee et al. | 370/389 |
| 2006/0245426 A1 * | 11/2006 | Rasanen | 370/389 |
| 2007/0186100 A1 * | 8/2007 | Wakameda | 713/160 |
| 2007/0189329 A1 * | 8/2007 | Latvala | 370/466 |
| 2008/0049621 A1 * | 2/2008 | McGuire et al. | 370/236.2 |
| 2008/0114898 A1 * | 5/2008 | Takeda et al. | 709/245 |
| 2008/0155657 A1 * | 6/2008 | Ogura et al. | 726/3 |
| 2010/0091707 A1 * | 4/2010 | Janneteau et al. | 370/328 |
| 2010/0254255 A1 * | 10/2010 | Devarapalli | 370/216 |

OTHER PUBLICATIONS

Internet Protocol DARPA Internet Program Protocol Specification. RFC 791, Information Sciences Institute, University of Southern California, Sep. 1981.

"IP Option Numbers", last updated Feb. 15, 2007, on http://www.iana.org/assignments/ip-parameters.

* cited by examiner

| SERVICE | GLOBAL ADDRESS |
|---|---|
| A | x.0.0.0~x.255.255.255 |
| B | y.z.0.0~y.z.255.255 |
| ... | ... |

| 0 1 2 3 | 4 5 6 7 | 8 9 10 11 12 13 14 15 | 16 17 18 19 20 21 22 23 24 25 26 27 28 29 30 31 |
|---|---|---|---|
| Ver.(4bit) | IHL(4bit) | ToS(DS)(8bit) | PACKET LENGTH(16bit) |
| IDENTIFICATION(16bit) | | | FLAGS / FRAGMENT OFFSET(13bit) |
| TTL(8bit) | | PROTOCOL(8bit) | HEADER CHECK SUM(16bit) |
| SOURCE ADDRESS (32bit) | | | |
| DESTINATION ADDRESS(32bit) | | | |
| OPTION & PADDING | | | |

| 0 1 2 3 4 5 6 7 | 8 9 10 11 12 13 14 15 | 16 17 18 19 20 21 22 23 24 25 26 27 28 29 30 31 |
|---|---|---|
| OPTION TYPE(8bit) | OPTION LENGTH (8bit)=6 | FORMER OPTION DATA(16bit) |
| LATTER OPTION DATA(16bit) | | |

16 BITS FROM MSB     16 BITS FROM LSB

| HOST NAME | RECORD TYPE | IP ADDRESS |
|---|---|---|
| www.xyz.com | O | 162.162.162.11      192.168.0.1<br>(GLOBAL ADDRESS) (PRIVATE ADDRESS) |
| ... | ... | ... |

FIG. 10A http://www.iana.org/assignments/ip-parameters

FIG. 10B www.xyz.com

ADDRESS TRANSLATOR USING ADDRESS TRANSLATION INFORMATION IN HEADER AREA ON NETWORK LAYER LEVEL AND A METHOD THEREFOR

BACKGROUND OF THE INVENTION

1. Field of the Invention

The present invention relates to an apparatus and a method for translating IP (Internet Protocol) addresses used on an IP network, e.g. IPv4 (IP version 4) telecommunications network, in which a global address may be used in common with a plurality of access nodes, thereby suppressing the global address resource from going to exhaust.

2. Description of the Background Art

In the conventional IP network, a manner of sharing a global address with several nodes has been established by mapping a node group having plural private addresses onto the port number included in information of a Layer 4 header. For instance, there are generally used the NAT (Network Address Translation) and NAPT (Network Address Port Translation) manners as disclosed in RFC791, "Internet Protocol", September 1981, and RFC3022, "Traditional IP Network Address Translator (Traditional NAT)", January 2001, respectively. In addition, Japanese patent laid-open publication No. 2006-5754 discloses techniques utilizing the NAT manner.

In recent years, a rapid spread of various telecommunications networks causes the IPv4 address resource, to be allocated as global addresses, to exhaust. As a result, the necessity of IPv6 (IP version 6) is more increased and popularization of IPv6 is more required.

In fact, however, almost widely popularized terminal devices can work only under the IPv4. Taking suppression of charges on users into account, common carriers should not easily recommend the users to replace their devices with ones available for IPv6.

Therefore, in a transitional period when networks are shifted from the IPv4 environment to the IPv6 environment, the networks will possibly have to work under the IPv6 environment besides the IPv4 environment. In the future also, the IPv4 addresses will possibly continue to be utilized to maintain their important position.

Now, a network art is required which uses the NAT in access control to the Internet to allocate private IPv4 addresses to end users.

With the conventional NAT manner, however, since an IPv4 global address has to be used in common with plural users, available port numbers may be restrictive. For example, if 65,535 ports are shared with plural, e.g. 2,000, users, only 25 to 30 sessions are available for each user.

For example, when acquiring image data, use is generally made of multi-session access in which a session is used per image so that more images to be acquired cause more sessions required. In case of acquiring images around San Francisco, United States, on the website of Google (trademark) Maps, for example, images can be displayed ordinarily with 30 sessions. However, if only 15 sessions are used, approximately half of the images may be displayed. Moreover, if only five sessions are used, an error message "server is not found" may be displayed. For other websites, such as Yahoo (trademark), ITunes (trademark) and Rakuten (trademark), approximately 10 to 20, 230 to 270 and 90 sessions may respectively be required.

In the IPv4 environment, in order to make a smooth use of web applications thus using a multi-session access to work by transmitting and receiving a large amount of information within a short period of time, a carrier-grade address translation system will be necessary.

In addition, the traditional address translation technology, such as NAT, is able to efficiently utilize global addresses, but is not able to deal with modern applications for peer-to-peer or end-to-end communications, such as VoIP (Voice over IP) communications. There is therefore a problem that applications are restrictively available.

SUMMARY OF THE INVENTION

It is an object of the present invention to provide an address translator and an address translation method that are capable of dealing with users over ten thousand and then making hundred sessions available per user, having open measures which do not essentially interrupt actions of any applications, as done on a router for SOHO (Small-Office/Home Office) use, having high availability, and establishing supports for end-to-end duplex communications.

It is anther object of the present invention to provide an address translation program, a name resolution system, a name resolution method and a name resolution program, and a node on a telecommunications network that are capable of satisfying the afore-mentioned conditions.

In accordance with the present invention, an address translator for use in an IP (Internet Protocol) network for carrying out address translation between a private address and a global address on a source address or a destination address in the header of a packet comprises a network interface for receiving a packet from the IP network, and an address translation processor for applying the address translation information to the header area of the received packet on a network layer level and using the address translation information to carry out the address translation on the network layer level.

Further, in accordance with the present invention, a method in an IP network for carrying out address translation between a private address and a global address on a source address or a destination address included in the header of a packet comprises the steps of receiving a packet from the IP network, and applying address translation information to the header area of the received packet on a network layer level and using the address translation information to carry out the address translation on the network layer level by an address translation processor.

Moreover, in accordance with the present invention, an address translating program for controlling a computer to carry out address translation between a private address and a global address on a source address or a destination address in the header of a received packet makes the computer work as an address translation processor that applies address translation information to the header area of the received packet on a network layer level and uses the address translation information to carry out an address translation on the network layer level.

Furthermore, in accordance with the present invention, a telecommunications node for using a global address to communicate with a correspondent node belonging to a private network comprises an address translation information applying section for applying address translation information, which includes a private address of the private network to which the correspondent node belongs, to the header area of a packet on a network layer level as destination address information according to a combination of a global address and a private address to be used, and a transmitter for transmitting the packet including the address translation information to the correspondent node.

In addition, in accordance with the present invention, a name resolution system inan IP network for receiving an inquiry on a host from a client and searching for, and notifying the client of, either address information or the host name of the host comprises an address information storage for storing the address information including a global address and a private address in connection with each of a plurality of hosts, an inquiry receiver for receiving an inquiry sent from the client, a searcher for searching the address information storage on the basis of the address information or the host name of the host relating to the inquiry for the address information including the global address and the private address or the host name of the host associated with the inquiry, and a notifier for notifying the client of the address information or the host name of the host searched for.

Further, in accordance with the present invention, a name resolution method in an IP network for receiving an inquiry on a host from a client and searching for, and notifying the client of either address information or the host name of the host comprises the steps of using a name resolution system that comprises an address information storage for storing the address information including a global address and a private address in connection with each of a plurality of hosts, an inquiry receiver, a searcher and a notifier, receiving an inquiry sent from the client by the inquiry receiver, searching by the searcher the address information storage on the basis of the address information or the host name of the host relating to the inquiry for the address information including the global address and the private address or the host name of the host associated with the inquiry, and notifying by the notifier the address information or the host name of the host searched for.

Moreover, in accordance with the present invention, a name resolution program for controlling a computer in an IP network system to receive an inquiry on a host from a client and search for, and notify the client of, either address information or the host name of the host makes the computer work as an address information storage for storing the address information including a global address and a private address in connection with each of a plurality of host, an inquiry receiver for receiving an inquiry sent from the client, a searcher for searching the address information storage on the basis of the address information or the host name of the host relating to the inquiry for the address information including the global address and the private address or the host name of the host associated with the inquiry, and a notifier for notifying the client of the address information or the host name of the host searched for.

According to the address translator of the present invention, it is possible to establish high transparency, high possibility to establish interconnection, impartial assurance for users, high throughput and high availability, and thus provide open measures which minimize interrupt actions of any communication as well as possible.

BRIEF DESCRIPTION OF THE DRAWINGS

The objects and features of the present invention will become more apparent from consideration of the following detailed description taken in conjunction with the accompanying drawings in which:

FIGS. 10A and 10B illustrate internet addresses useful in explaining the invention.

DESCRIPTION OF THE PREFERRED EMBODIMENT

With reference to the accompanying drawings, a preferred embodiment of an address translator according to the present invention will be described below. The address translation may be established by a program, and may be applied to a name resolution system, a name resolution method and a name resolution program, and a node in a telecommunications network.

Figure 1:
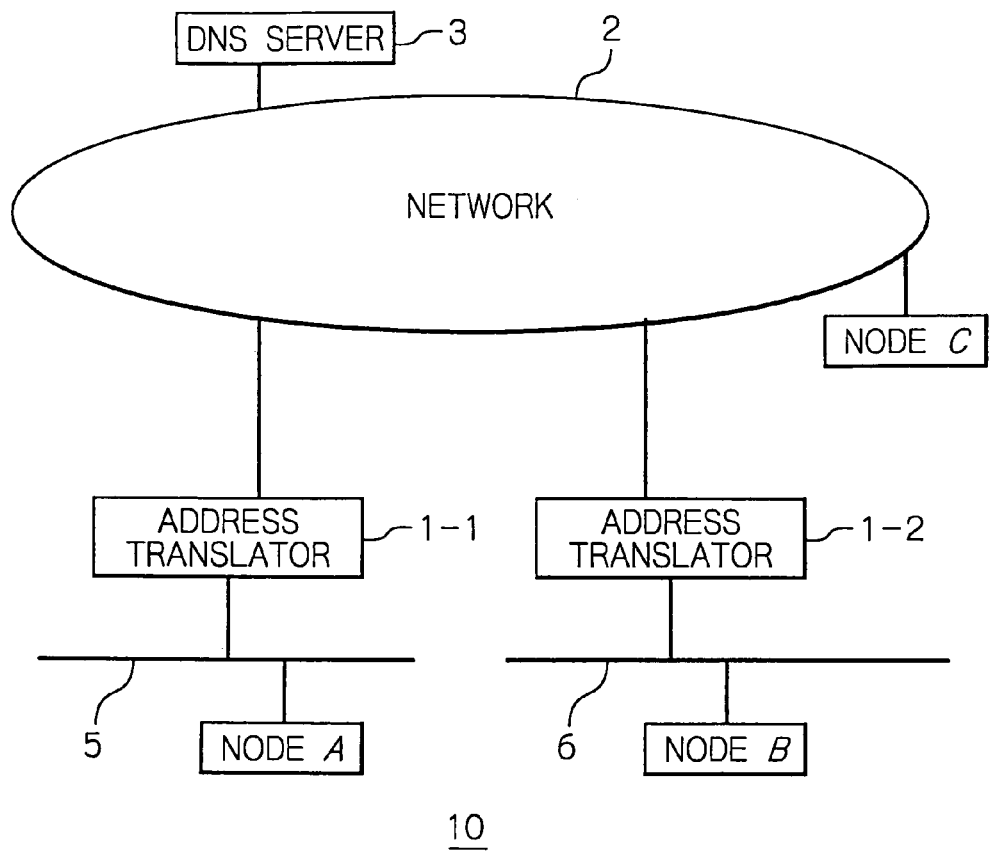
FIG. 1 is a schematic system diagram showing a telecommunications network to which a preferred embodiment of an address translator is applied in accordance with the present invention.

FIG. 1 is a schematic system diagram showing a telecommunications network, such as an IP (Internet Protocol) network, specifically in connection with an address translator of the preferred embodiment. In FIG. 1, the IP network system according to the preferred embodiment includes at least a DNS (Domain Name System) server 3 connected to an IP network 2, communication access nodes A, B and C, and address translation communication devices, i.e. address translators, 1-1 and 1-2.

The communications network 2 in the network system shown in FIG. 1 works under the IPv4 (IP version 4). In the system, traffic between the nodes A and C, B and C and A and B is established always over the network 2.

The network 2 may be, for example, the Internet, having its communication protocol based upon IP protocol, under which IPv4 global addresses are allocated to nodes. In addition, the network 2 may be configured with wired and/or wireless systems.

The nodes A and B are connected to respective private networks 5 and 6. The private networks 5 and 6 are also IP networks adapted to allocate IPv4 local addresses for thereby saving the address resource. The node C is directly connected to the network 2, and has a global address directly allocated thereto.

The address translators 1-1 and 1-2 are adapted to translate addresses between the respective private networks 5 and 6 to which the nodes A and B belong, and the network 2. Specifically, the address translator 1-1 is connected to both one private network 5 to which the node A belongs and the network 2. The address translator 1-2 is connected to both the other private network 6 to which the node B belongs and the network 2.

The address translators 1-1 and 1-2 may be, in order to use global addresses over the network 2, adapted to translate the transmission source or destination IP address of a packet and to incorporate the private address of a node A or B that belongs to a private network 5 or 6, respectively, into the option field of the header of the packet.

For example, with regard to a packet transmitted from the node A to the node C, the source IP address included in the packet header sent from the node A is translated into a global address, and then the source IP address of that packet is applied to, or incorporated into, the option field.

By contrast, with regard to a packet transmitted from the node C to the node A, the destination IP address, i.e. global address, included in the packet sent from the node C is translated into the private address of the node A.

As described above, since the address translation information is closed within Layer 3, i.e. the network layer, it is possible to use the NAT in the IPv4 environment, without imposing restriction on the number of ports of the transport layer, Layer 4, in a similar way to a connection made by means of global addresses.

The DNS server 3 may work as a name resolution system to receive an inquiry about a host from a DNS resolver, and then to search for the IP address of the host to issue the latter.

Figure 2:
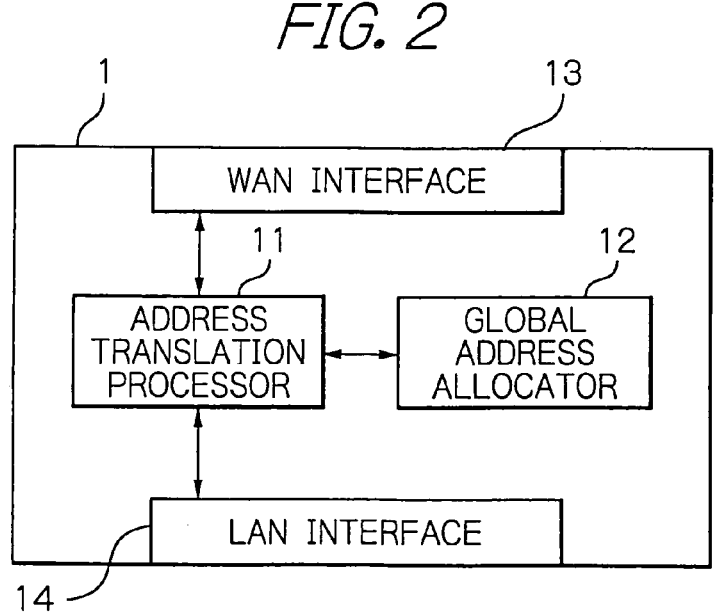
FIG. 2 is a schematic block diagram showing the internal structure of the address translator of the preferred embodiment.

FIG. 2 is a schematic block diagram showing the internal structure of the address translator 1 of the preferred embodiment. The address translators 1-1 and 1-2, which may be of the same configuration as each other, are generally represented in FIG. 2 as the address translator 1.

As shown in FIG. 2, the address translator 1 includes an address translation processor 11, a global address allocator 12, a network interface 13 and a local area network interface 14, which are interconnected as illustrated.

The network interface 13, which may be referred to as WAN (Wide Area Network) interface for convenience only, is connected to the network 2, and adapted to receive packets from the network 2 to supply the received packets to the address translation processor 11, and to receive packets to be transmitted from the address translation processor 11 to send the packets to be transmitted to the network 2.

The local area network interface 14 is connected to the private network 5 or 6 to which the node A or B belongs, respectively, and adapted to receive a packet from the corresponding private network 5 or 6 to supply the received packet to the address translation processor 11, and to receive a packet to be transmitted from the address translation processor 11 to send the packet to be transmitted to the private network 5 or 6. For a description purpose only, the private networks 5 and 6 may be referred to as a local area network (LAN).

Figures 3, 4, 5, 6:
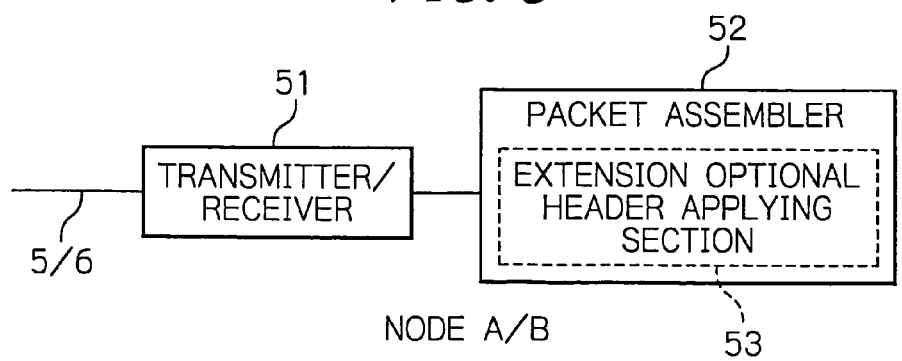
FIG. 3 schematically shows exemplified global address ranges allocated to the address translator of the preferred embodiment.
FIG. 4 schematically shows the structure of IP header area of a packet.
FIG. 5 schematically shows the structure of an extension optional header applied to the option field in the IP header area in accordance with the preferred embodiment.
FIG. 6 is a schematic block diagram showing the internal structure of a node of the preferred embodiment.

The global address allocator 12 is adapted to store global addresses to be used on the network 2. In the global address allocator 12, a range of global addresses to be allocated is arranged for a particular service. FIG. 3 shows a global address allocation table that represents the allocation ranges of global addresses determined in the global address allocator 12.

As shown in FIG. 3, the global address allocation table consists of one item, or column, for defining services and another item, or column, for defining global addresses. In the figure, for example, the global addresses "x.0.0.0 to x.255.255.255" are determined for service A, and the global addresses "y.z.0.0 to y.z.255.255" are determined for service B.

The address translation processor 11 is adapted to receive a packet from the WAN interface 13 or the LAN interface 14 to carry out header translation for the received packet.

FIG. 4 shows the structure of the IP header area of a packet. As shown in the figure, the IP header area includes some fields, such as version (Ver.), Internet header length (IHL), type of service (ToS), packet length, identification, flags, fragment offset, time to live (TTL), protocol, header checksum, source address, destination address, and option and padding.

In the Ver. field, the IP version of the packet is written. Specifically in the preferred embodiment, number "4" representing IPv4 is written. In the IHL field, the length of the IPv4 header and a front position of a payload are written. In the ToS and packet length fields, a service type and a data length of the payload are respectively written.

Moreover, in the identification field, an identification value on fragmentation is written. The flags and fragment offset fields are used for fragmentation.

Furthermore, in the TTL field, a value indicating the maximum life of data is written. If the life value reaches zero, the data should be cancelled. The protocol field is used for indicating the protocol of the next layer in the IP. In the header check sum field, a check sum is written, which is calculated according to the sum total of all 16-bit words in the IPv4 header in order to warrant the reliability of the header.

The option field may be a variable-length field to be used for serving extended functions. For instance, in the preferred embodiment, the address translation processor 11, when transmitting a packet from the private network to the network 2, utilizes the option field for duplicating therein the private address of a source node. The padding field may be a data field utilized for adjusting the header length to a multiple of 32 bits.

After the address translation processor 11 has received a packet from the local area network interface 14, the processor 11 carries out header translation on the received packet with reference to global addresses determined in the global address allocator 12. In more detail, the address translation processor 11 replaces the source address included in the header information with a global address and applies the source address, i.e. private address, to the option field to form a source address extension optional header. The address translation processor 11 also rewrites or updates the IHL field, the TTL field according to a decrement of the number of hops, and the header check sum field according to recalculation of the header check sum for the received packet.

Next, it will be described with reference to FIG. 5 how the address translation processor 11 applies, or assembles, the address extension optional header. FIG. 5 shows the structure of an extension optional header to be applied to the option field. As shown in the figure, the extension optional header includes some fields, such as option type, option length, and former and latter halves of option data.

In the option type field, an option type is written which is represented by eight bits, for example.

The bit position #0, i.e. least significant bit, in the option type field represents Copied Flag of 1 bit. In order to independently carry out the address translation process and the fragment combining process from each other in the fragmentation of a packet, it is necessary to copy the same option content into all fragments of the packet. For this reason, the Copied Flag is given a fixed value, e.g. "1".

The bit positions #1 and #2 represent Option Class of 2 bits for controlling data to be given a fixed value, "0", for example.

The bit positions #3 to #7 represent Option Number of 5 bits for writing the option number that indicates which of the source and destination address extension options is utilized.

For example, the Option Number may be determined so that currently unused numbers, e.g. the option type values 26 and 27, respectively, represent the source and destination address extension options as referred to on the website "IP OPTION NUMBERS", at the address shown in FIG. 10A.

Alternatively, numbers "154" and "155" may be utilized as the option type values of the source and destination address extension options.

In the option length field, the data length of an option field is written. The data length is represented by the number of octets to define the sum total of the lengths of the option type, option length and option data. In the embodiment, the data length may take a fixed value, "6" for example.

In the option data field, a private address associated with the packet received is written as it is.

Furthermore, since applying the source address extension optional header may cause the header length to increase, the address translation processor 11 determines whether or not the size of a resultant packet exceeds the MTU (Maximum Transmission Unit). If the packet size exceeds the MTU, then the processor 11 carries out fragmentation. In the fragmentation, the address translation processor 11 processes the flags and fragment offset fields of the header area shown in FIG. 4, as read below.

In the flags field, a control flag of 3 bits is written, wherein the bit position #0 represents a reservation flag to be given a value of "0", the bit position #1 represents a flag indicating whether or not fragmentation is needed, and the bit position #2 represents a flag indicating whether or not fragmentation has finished. The fragment offset field is used for indicating which position in the original data corresponds to the fragment data.

In the fragmentation process, the address translation processor 11 uses the bit position #1 of the flags field as a control bit that indicates fragmentation is needed, and then translates the value of the bit position #2 according to the fragmented packet.

The address translation processor 11 then transfers the packet whose header has been translated as described above to the network interface 13.

Now, after the address translation processor 11 has received a packet from the WAN interface 13, the processor 11 carries out header translation on the received packet. In more detail, the address translation processor 11 replaces the destination address with a private address and deletes the destination address extension optional header incorporated in the option field for the received packet. The address translation processor 11 also rewrites or updates the IHL field, the TTL field according to a decrement of the number of hops, and the header check sum field according to recalculation of the header check sum for the received packet.

The destination address extension optional header is the same as described above with reference to FIG. 5.

Thus, the address translation processor 11 receives the packet from the network 2, carries out header translation for the received packet, and then transfers the translated packet to the local area network interface 14.

Next, the internal configuration of the nodes A and B, which may be the same in configuration, will be described with reference to FIG. 6, which is a block diagram schematically showing the internal structure of the node of the preferred embodiment. In the figure, the node includes a transmitter/receiver 51 and a packet assembler 52, which are interconnected as depicted.

The transmitter/receiver 51 is adapted to receive packets from the network 2 and transmit packets assembled by the packet assembler 52 to the network 2.

The packet assembler 52 is adapted to assemble packets to be transmitted. In the preferred embodiment, the packet assembler 52 includes an extension optional header applying section 53.

In case that a destination node is assigned to a unique combination of global and private addresses, the extension optional header applying section 53 is adapted to apply or insert a private address into the option field of the header of a packet. Thus, it is possible to form a packet which is to be sent to the network 2 and has its destination IP address representing a global address and its header having the option field storing the private address therein.

When the extension optional header applying section 53 has received a packet from a correspondent node, the section 53 may use the source address extension optional header included in the option field of the received packet header to produce a destination address extension optional header.

Here, the extension optional header applied to the option field may be similar in structure to the header shown in FIG. 5. The extension optional header applying section 53 applies the private address and at the same time rewrites the option type field.

The DNS server 3 is adapted to receive an inquiry about a host from the DNS resolver to search for the IP address of the host and to send back the IP address to the DNS resolver, as outlined above.

Figures 7A, 7B:
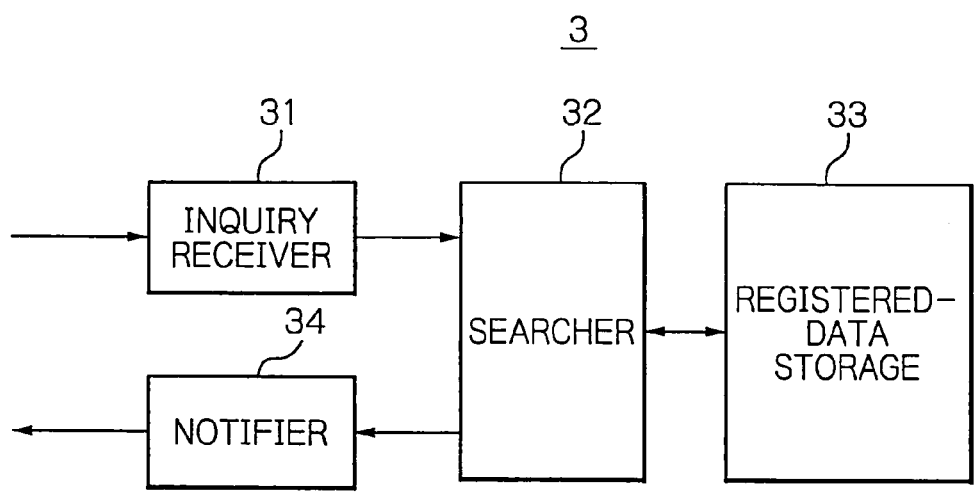
FIG. 7A is a schematic block diagram showing the internal structure of a DNS (Domain Name System) server of the preferred embodiment.
FIG. 7B schematically shows exemplified data registered in the DNS server.

FIG. 7A is a schematic block diagram showing the internal structure of the DNS server 3. As shown in the figure, the DNS server 3 includes at least an inquiry receiver 31, a searcher 32, a registered-data storage 33 and a notifier 34, which are interconnected as illustrated.

The inquiry receiver 31 is adapted to receive an inquiry about name resolution from a DNS resolver to transfer the inquiry to the searcher 32.

The searcher 32 is adapted for searching the registered-data storage 33 for an IP address on the basis of the host name associated with the inquiry to supply the notifier 34 with the IP address thus searched for.

The notifier 34 is adapted to notify the IP address searched for by the searcher 32 to the DNS resolver having issued that inquiry.

The registered-data storage 33 has a storage area to form a database for storing registered data.

FIG. 7B shows an example of table of registered data stored in the registered-data storage 33 of the DNS server 3. The registered data consist of records, exemplified in FIG. 7B, each of which defines a host name in association with a global IPv4 address of 32 bits and a corresponding private IPv4 address of 32 bits. Since the option field is used for a record, the record will hereinafter be called "O record", as indicated in the column named "record type".

For example, in the O record shown in FIG. 7B, recorded are the host name shown in FIG. 10B, the global IPv4 address of "162.162.162.11" and the private IPv4 address of "192.168.0.1".

By using the table thus defined, it is possible to obtain a destination IP address together with a destination private address to be applied to the option field. As a result, without using a solution, such as NAT transversal, it is possible to carry out the duplex end-to-end communications and attain high transparency in communications.

In the example as shown in FIG. 7B, the registered data is recorded illustratively as forward lookup registered data so that an IP address is searched for on the basis of a host name.

However, the recording of registered data is not restricted by this specific example but may be established by reverse lookup registered data so that a host name is searched for on the basis of an IP address.

Now, the operation of the address translation process by the address translator of the preferred embodiment will be described with reference to further figures. Specifically, the address translator 1-1 carries out the address translation process for traffic transferred between the nodes A and C in a manner as described below.

Figure 8:
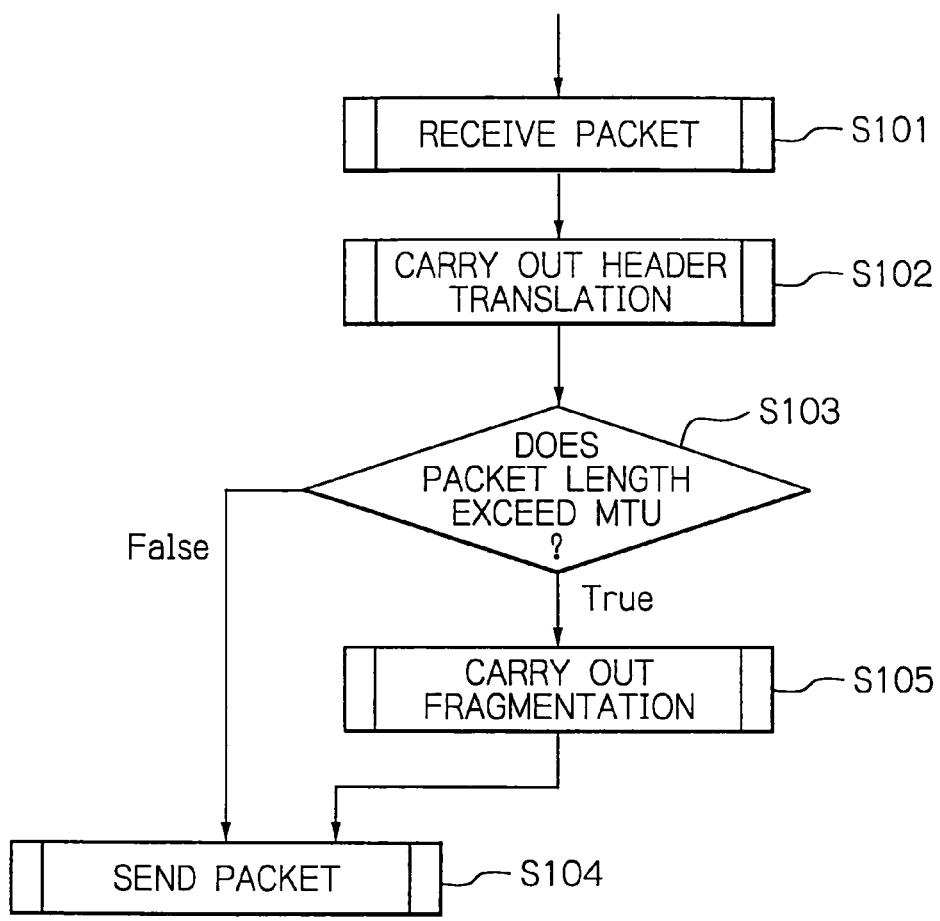
FIG. 8 is a flowchart useful for understanding the address translation process for packet transfer from the private network to another network in accordance with the preferred embodiment.

FIG. 8 is a flowchart useful for understanding that the address translator 1-1 processes a packet transferred from the private network 5 to another network.

First, a packet which is to be sent from the node A to the node C is supplied to the address translator 1-1 (step S101). At this point, in the packet header information, the global address of the node C is incorporated in the destination IP address and the private address of the node A is incorporated in the source IP address.

When the packet has been received in the address translator 1-1, the translator 1-1 carries out the header translation on the header information in the received packet (step S102).

At this point, the address translation processor 11 of the address translator 1-1 applies the source extension optional header including the source IP address (the private address of the node A) to the received packet. Furthermore, the address translation processor 11 carries out the rewrite or update of the IHL field, the decrement of the number of hops and the recalculation and rewrite of the header check sum for the packet.

Since the packet length has been increased due to the source address extension optional header being thus applied, the address translation processor 11 in tune determines whether or not the packet size exceeds the MTU of output interface (step S103). If the packet size does not exceed the MTU, then the address translator 1-1 sends out the packet having the address thus translated to the network 2 (step S104).

Otherwise, that it, if the packet size exceeds the MTU, the address translation processor 11 carries out the fragmentation to thereby divide the packet thus produced into plural packets (step S105). At this time point, the address translation processor 11 rewrites the identification, flags and fragment offset fields, and then sends out the resultant, fragmented packets to the network 2 (step S104).

Figure 9:
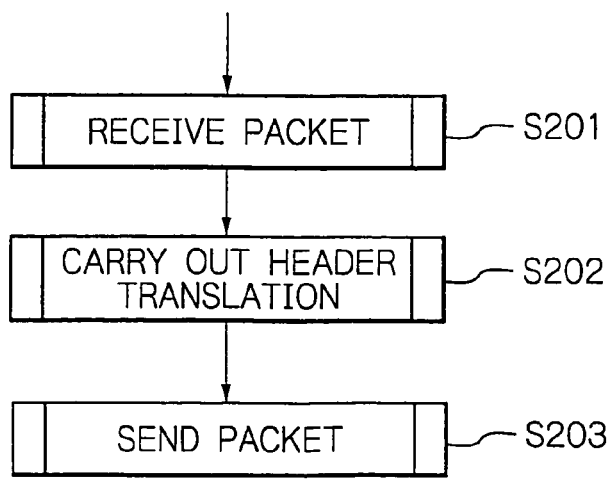
FIG. 9 is a flowchart useful for understanding the address translation process for packet transfer from the other network to the private network in accordance with the preferred embodiment.

FIG. 9 is a flowchart useful for understanding that the address translator 1-1 processes a packet transmitted from the network 2 and destined to the private network 5.

First, the node C produces a packet which has its destination and source IP addresses set to the global addresses of the nodes A and C, respectively, and its option field set to the private address of the node A. The node C then sends out the packet thus produced to the node A.

If the node C has then received a packet from the node A, the node C replaces the source IP address of the received packet, which is a global address, with the destination IP address of a new packet to be transmitted and uses the private address of the node A included in the option field of the received IP header to thereby apply the destination address extension optional header to the new packet, thus forming the new packet from the received packet.

By contrast, if the node C has not received a packet from the node A, the node C inquires of the DNS server 3 the IP address of the node A to thereby obtain the global and private addresses of the node A. The node C uses the global and private addresses to set the global address of the node A into the destination IP address of a new packet and incorporate the destination address extension optional header with the private address of the node A into the new packet, thus producing the new packet.

When the address translator 1-1 has received the packet meant for the node A from the node C (step S201), the address translation processor 11 of the translator 1-1 carries out the header translation on the received packet (step S202).

Here, the address translation processor 11 rewrites the destination IP address of the IP header of the received packet with the private address of the node A represented in the destination address extension optional header included in the option field of the received packet. The processor 11 deletes the destination address extension optional header included in the option field of the received packet. Moreover, the address translation processor 11 rewrites the IHL field, decrements the number of hops, and recalculates and rewrites the header check sum field for the packet. Then, since there is no possibility that those processes of the packet cause an increase of the packet length, it is possible to send out the packet to the local area network interface 14 (step S203) without performing the additional check, such as step S103.

In regard to the preferred embodiment, the translation process required for the traffic between the nodes A and C has been described. Similarly, the address translator of the invention can carry out the same translation process for traffic between the nodes B and C.

Thus, according to the preferred embodiment, since the address translation information is thus closed in the Layer 3, i.e. network layer, it is possible to use the NAT in the IPv4 environment without restricting the number of ports of the transport layer, Layer 4, in a similar way to a connection made by means of the global addresses.

Further, in the preferred embodiment, since a private address can be directly written into the identification information area as the identifier of a node, it is not necessary to provide any storage area or database otherwise required for mapping the address translation process such as NAT process in the address translator.

Furthermore, in the preferred embodiment, the transmitting and receiving means for extension information is provided for extending the DNS, it is possible to establish an end-to-end connection and save a special protocol from being used for the NAT traversal.

With reference to the figures, an alternative embodiment of an address translator according to the present invention will be described below. The address translation also may be established by a program and may be applied to a name resolution system, a name resolution method and a name resolution program, and a node in a network.

The above-described embodiment is directed to the translation process for traffic between the node A or B and the node C. The alternative embodiment will be described as to the address translator carrying out a translation process for traffic between the nodes A and B as read below.

The network connection the alternative embodiment may be similar to the preferred embodiment shown in and described with reference to FIG. 1. Therefore, the alternative embodiment will be described with reference to FIG. 1. Similarly, the internal structure of the address translators 1-1 and 1-2 of the alternative embodiment may be similar to that of the embodiment shown in FIG. 2, and therefore, will be described with reference to FIG. 2.

The nodes A and B belong to the different private networks from each other. Therefore, for communication between the nodes A and B, traffic are transmitted between the nodes always via the network 2.

The address translation process required for the communication between the nodes A and B will be described with reference to FIGS. 8 and 9.

First, the node A produces a packet to be sent to the node B. Then, the private address of the node A and the global address of the node B are respectively used as the source IP address and the destination IP address of the packet, and the destination address extension optional header, of which the option field includes the global address of the node B, is applied to the packet.

If the node A does not know the private address of the node B, the node A inquires it of the DNS server 3 to obtain the global and private addresses of the node B, and then produces a packet by using the obtained addresses.

Next, when the address translator 1-1 has received the packet produced by the node A (step S101, FIG. 8), the address translation processor 11 of the translator 1-1 carries out the header translation on the received packet (step S102).

The address translation processor 11 then translates the source IP address to the global address and applies the source address extension optional header for the received packet, similarly to the preferred embodiment described earlier.

At this point, in the option field of the packet header, the destination address extension optional header has already been applied, but the source address extension optional header is further applied separately therefrom.

Moreover, the address translation processor 11 rewrites the IHL field, decrements the number of hops, and recalculates and rewrites the header check sum field for the received packet, similarly to the preferred embodiment described earlier.

Next, due to the source and destination address extension optional headers applied, the address translation processor 11 determines whether or not the packet size exceeds the MTU (step S103). If the packet size does not exceed the MTU, the address translator 1-1 sends out the packet to the network 2 (step S104). Otherwise, namely, if the packet size exceeds the MTU, the processor 11 carries out the fragmentation on the produced packet (step S105), and then sends out the fragmented packet to the network 2 (step S104).

When the packet transmitted over the network 2 has been received by the address translator 1-2 to which the node B belongs (step S201, FIG. 9), the address translation processor 11 of the translator 1-2 carries out the header translation on the received packet (step S202).

Then, the address translation processor 11 translates the destination IP address of the received packet to the private address of the node B represented in the destination address extension optional header included in the option field of the received packet, and then deletes the destination address extension optional header included in the option field.

In addition, the address translation processor 11 rewrites the IHL field, decrements the number of hops, and recalculates and rewrites the header check sum field for the received packet. Then, since there is no possibility that those processes of the packet cause an increase of the packet length, it is possible to send out the packet to the local area network interface 14 without proceeding to the additional check (step S203)

Thus, in accordance with the alternative embodiment, in case of communication between the nodes that belong to the respective private networks different from each other, it is possible to attain the same advantages as the preferred embodiment described earlier.

The entire disclosure of Japanese patent application No. 2008-210846 filed on Aug. 19, 2008, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An address translator, for use between an IP (Internet Protocol) network and a further network, for carrying out address translation between a private address and a global address of a source address or a destination address included in a header of a packet, the private address being the address of a first node on the further network and the global address being the address of a second node on the IP network, said address translator comprising:
    interface means for receiving and transferring a packet from the IP network or the further network; and
    an address translation processor for inserting address translation information in a header area of the received packet at a network layer level and for using the address translation information to carry out the address translation at the network layer level,
    wherein said address translation processor rewrites, if the packet is to be transferred to the second node from the first node, the source address field of the header area from the private address of the first node to the global address of the first node, and then inserts the address translation information including the private address of the first node in an option field of the header area, and
    wherein said address translator additionally rewrites, if the packet is to be transferred from the second node to the first node, the destination address field of the header area from the global address of the second node to the private address of the first node inserted in the option field on the basis of the address translation information, and then deletes the address translation information inserted in the option field.

2. The address translator in accordance with claim 1, wherein the address translation information is extension optional information including the source private address, which is applied to an option field of an IPv4 (IP version 4) protocol header, of the first node.

3. The address translator in accordance with claim 1, further comprising a global address allocator for storing data about a predetermined range of the global addresses to be allocated.

4. A method for carrying out address translation between a private address of a first node and a global address of a second node on a source address or a destination address included in a header of a packet, the second node being on an IP (Internet Protocol) network and the first node being on a further network, said method comprising the steps of:
    receiving and transferring a packet from the IP network or the further network; and
    inserting address translation information in a header area of the received packet at a network layer level and using the address translation information to carry out the address translation at the network layer level by an address translation processor,
    wherein said inserting step rewrites, if the packet is to be transferred to the second node from the first node, the source address field of the header area from the private address of the first node to the global address of the first node, and then inserts the address translation information including the private address of the first node in an option field of the header area, and wherein said inserting step additionally rewrites, if the packet is to be transferred from the second node to the first node, the destination address field of the header area from the global address of the second node to a private address of the first node inserted in the option field on the basis of the address translation information, and then deletes the address translation information inserted in the option field.

5. A non-transitory computer-readable medium that stores an address translating program which, when executed, controls a computer in an IP (Internet Protocol) network system so as to carry out address translation between a private address of a first node and a global address of a second node on a source address or a destination address included in a header of a received packet, the second node being on an IP (Internet Protocol) network and the first node being on a further network, wherein said program makes the computer work as an address translation processor that inserts address translation information in a header area of the received packet at a network layer level and uses the address translation information to carry out an address translation at the network layer level, said address translation processor rewrites, if the packet is to be transferred to the second node from the first node, the source address field of the header area from the private address of the first node to the global address of the first node, and then inserts the address translation information including the private address of the first node in an option field of the header area, and said address translation additionally rewrites, if the packet is to be transferred to the second node from the first node, the destination address field of the header area from the global address of the second node to the private address of the first node inserted in the option field on the basis of the address translation information, and then deletes the address translation information inserted in the option field.

6. The method in accordance with claim 4, wherein the address translation information is extension optional information including the source private address, which is applied to an option field of an IPv4 (IP version 4) protocol header, of the first node.

7. The method in accordance with claim 4, further comprising the step of storing data about a predetermined range of the global addresses to be allocated.

8. The medium in accordance with claim 5, wherein the address translation information is extension optional information including the source private address, which is applied to an option field of an IPv4 (IP version 4) protocol header, of the first node.

9. The medium in accordance with claim 5, wherein said program further makes the computer work as a global address allocator for storing data about a predetermined range of the global addresses to be allocated.

10. The address translator in accordance with claim 1, wherein the option field of the packet holds only one address.

11. The method in accordance with claim 4, wherein the option field of the packet holds only one address.

12. The non-transitory computer-readable medium in accordance with claim 5, wherein the option field of the packet holds only one address.

* * * * *